US010594805B2

(12) United States Patent
Smith (10) Patent No.: US 10,594,805 B2
(45) Date of Patent: Mar. 17, 2020

(54) PROCESSING SERVICE REQUESTS FOR DIGITAL CONTENT

(71) Applicant: BRITISH TELECOMMUNICATIONS PUBLIC LIMITED COMPANY, London (GB)

(72) Inventor: Alan P. Smith, London (GB)

(73) Assignee: BRITISH TELECOMMUNICATIONS public limited company, London (GB)

( * ) Notice: Subject to any disclaimer, the term of this patent is extended or adjusted under 35 U.S.C. 154(b) by 575 days.

(21) Appl. No.: 15/108,844

(22) PCT Filed: Dec. 28, 2014

(86) PCT No.: PCT/GB2014/053747
§ 371 (c)(1),
(2) Date: Jun. 29, 2016

(87) PCT Pub. No.: WO2015/101774
PCT Pub. Date: Jul. 9, 2015

(65) Prior Publication Data
US 2016/0330287 A1    Nov. 10, 2016

(30) Foreign Application Priority Data

Dec. 31, 2013  (EP) .................................... 13250133

(51) Int. Cl.
*H04L 29/06* (2006.01)
*H04L 29/08* (2006.01)
(Continued)

(52) U.S. Cl.
CPC ............ *H04L 67/18* (2013.01); *H04L 12/283* (2013.01); *H04L 12/2812* (2013.01); *H04L 61/1511* (2013.01); *H04L 63/101* (2013.01)

(58) Field of Classification Search
CPC ... H04L 67/18; H04L 12/2812; H04L 12/283; H04L 61/1511; H04L 63/101; H04W 4/04
(Continued)

(56) References Cited

U.S. PATENT DOCUMENTS 5,983,270 A * 11/1999 Abraham ................ H04L 29/06
709/224
6,047,325 A *  4/2000 Jain ..................... H04L 12/4641
709/227
(Continued)

FOREIGN PATENT DOCUMENTS

WO    WO 2012/162099       11/2012

OTHER PUBLICATIONS

International Search Report and Written Opinion of the ISA for PCT/GB2014/053747 dated Mar. 17, 2015, 9 pages.
(Continued)

*Primary Examiner* — Madhu Woolcock
(74) *Attorney, Agent, or Firm* — Nixon & Vanderhye P.C.

(57) ABSTRACT

Methods and apparatus are disclosed for processing digital content service requests from user devices (1), each service request relating to digital content provided by a content provider, and comprising a server location request and a content request. The server location request comprises an indication of a network name of a content provider from which digital content is desired. The content request comprises an indication of a desired content item and a routing identifier indicating the network location of an applicable content server (9). The method comprises receiving a server location request; determining whether to serve or deny the server location request; receiving a content request; determining whether the content server routing identifier of the content request is of a first or second type; and allowing the content request if the content server routing identifier is not
(Continued)

Components/Functional Elements involved in performing content control in a home network scenario of the second type, or if the content server routing identifier is of the second type but it has been determined in response to an associated server location request that the applicable content provider is of the first type.

20 Claims, 3 Drawing Sheets

(51) Int. Cl.
*H04L 29/12* (2006.01)
*H04L 12/28* (2006.01)

(58) Field of Classification Search
USPC .................................................. 709/225, 219
See application file for complete search history.

(56) References Cited

U.S. PATENT DOCUMENTS

| | | | |
|---|---|---|---|
| 6,393,484 B1* | 5/2002 | Massarani | H04L 29/12018 709/225 |
| 6,425,010 B1* | 7/2002 | Alles | G06Q 30/02 709/225 |
| 7,792,994 B1 | 9/2010 | Hernacki | |
| 7,849,502 B1 | 12/2010 | Bloch et al. | |
| 7,921,063 B1* | 4/2011 | Quinlan | G06F 17/20 705/76 |
| 8,200,842 B1* | 6/2012 | Lau | H04L 43/0817 709/245 |
| 8,972,590 B2* | 3/2015 | Haghpassand | G06F 21/50 709/229 |
| 9,237,027 B2* | 1/2016 | Ellard | H04L 12/24 |
| 9,319,381 B1* | 4/2016 | Jones | H04L 63/0227 |
| 2005/0144279 A1* | 6/2005 | Wexelblat | G06Q 30/06 709/225 |
| 2007/0083670 A1* | 4/2007 | Kelley | H04L 29/12066 709/245 |
| 2007/0204040 A1 | 8/2007 | Cox | |
| 2007/0261112 A1* | 11/2007 | Todd | G06F 21/577 726/11 |
| 2007/0271220 A1* | 11/2007 | Carter | G06F 17/30867 |
| 2008/0172382 A1* | 7/2008 | Prettejohn | H04L 63/126 |
| 2010/0263022 A1* | 10/2010 | Wynn | H04W 12/06 726/3 |
| 2011/0078309 A1 | 3/2011 | Bloch et al. | |
| 2011/0191664 A1* | 8/2011 | Sheleheda | G06F 15/173 715/205 |
| 2012/0084423 A1* | 4/2012 | McGleenon | H04L 61/1511 709/223 |
| 2013/0223431 A1* | 8/2013 | Sugarman | H04W 40/00 370/352 |
| 2014/0019601 A1* | 1/2014 | Blacka | G06F 17/30887 709/223 |
| 2014/0164616 A1* | 6/2014 | Pinto | H04L 65/103 709/225 |
| 2014/0173111 A1* | 6/2014 | Varner | H04L 63/0281 709/225 |
| 2014/0258528 A1* | 9/2014 | Miller | H04L 47/70 709/225 |

OTHER PUBLICATIONS

EP Search Report for EP13250133.9 dated Jul. 2, 2014, 7 pages.
Martin Bright, "BT puts block on child porn sites", published in the Observer newspaper on Jun. 6, 2004, http://www.theguardian.com/technology/2004/jun/06/childrensservices.childprotection)—2 pages.
Wikipedia Definition Cleanfeed: http://en.wikipedia.org/wiki/Cleanfeed_(content_blocking_system, retrieved Jun. 29, 2016 —1 page.
Clayton, "Failures in a Hybrid Content Blocking System", Proceedings of the 5th International conference on Privacy Enhancing Technologies, 2005, PET '05, pp. 78-92, http://www.cl.cam.ac.uk/~mcl/cleanfeed.pdf).

\* cited by examiner

Figure 1 – Components/Functional Elements involved in performing content control in a home network scenario Figure 2 - Canonical Name to IP address blacklist mapping on DNS server Figure 3 – Functionality of IP address-based filter

PROCESSING SERVICE REQUESTS FOR DIGITAL CONTENT

This application is the U.S. national phase of International Application No. PCT/GB2014/053747 filed 18 Dec. 2014 which designated the U.S. and claims priority to EP Patent Application No. 13250133.9 filed 31 Dec. 2013, the entire contents of each of which are hereby incorporated by reference.

TECHNICAL FIELD

The present invention relates to methods and apparatus for processing digital content service requests (such as service requests comprising a DNS request followed by a subsequent content request in respect of content from a website) from user devices (such as computing devices) in a network (such as a home network, a company network or another type of customer or user network) in such a way as to allow the digital content service requests to be allowed or denied (for "parental control" or other reasons).

BACKGROUND TO THE INVENTION AND PRIOR ART

Normally, when a user wishes to obtain digital content via the Internet using an Internet-enabled computing device (such as a desktop computer, a laptop computer, a "tablet" device, a handheld device such as a "smart" mobile phone or "Personal Digital Assistant (PDA)" device, or another type of Internet-enabled device such as an Internet-enabled television or games-console), the user requests the content by typing (or otherwise entering, by selecting a link, for example) into the device's browser a Uniform Resource Locator (URL) (e.g. www.website-name.com/requested-content.html) for the content. The canonical name (i.e. www.website-name.com) part must be translated into an IP (Internet Protocol) address from which the content may be requested and subsequently received/downloaded. The translating of canonical names into IP addresses is generally done via the Domain Name Service (DNS), and involves the user's device submitting a DNS "look-up" request including the canonical name of the website from which the user wishes to obtain content) to a DNS server, which is usually controlled by the user's Internet Service Provider (ISP). The DNS server responds by providing the IP address of a content server to which a request for the desired content can be routed. The user device then submits its content request to that content server.

ISPs are able to provide "parental control" (or other such administrator-controlled) services to their customers in order to assist parents (or other such "administrators" of networks) in preventing or hindering access to inappropriate content by children (or other users of the network under the control of the administrator in question). It will be understood that the term "parental control", while particularly applicable in relation to scenarios involving family members using a home network, is applicable more generally, and that the techniques involved are generally applicable in relation to situations involving schools' networks, corporate networks, Internet cafes, and other networks where administrators wish to be able to exercise some level of control over the content they and/or other users may access. It will also be understood that the techniques involved in "parental control" may be applicable in relation to local networks, Virtual Private Networks (VPNs) and other such networks, which may be wired, wireless, or wired and wireless.

Parental control services may be provided using (amongst other techniques) a technique known as "DNS poisoning". This involves the DNS server responding to DNS requests in respect of websites the content from which is deemed inappropriate (for any of a variety of reasons) by NOT providing the IP address of a content server that can provide the desired content. It may ignore the DNS request, may return an alternative IP address, e.g. to a site from which a warning or explanatory message may then be received, or may otherwise "deny" the DNS request, in each case hindering the device from obtaining the desired content.

Looking at this further, with DNS poisoning, when a user selects or types into a device's browser a URL (e.g. www-.bad-website-name.com/bad-content.html), the device submits to its DNS server (as usual) a DNS "look-up" request including the canonical name of the website from which the user wishes to obtain content (i.e. www.bad-website-name-.com) in order to have the canonical name translated into an applicable IP address. The DNS server compares the canonical name to a blacklist of websites. If the canonical name is on the blacklist then the DNS server will not return an applicable IP address for the blocked canonical name. As explained above, it may ignore the DNS request entirely, may return an alternative IP address (e.g. to a site with a "warning" or "explanatory" message), or may otherwise "deny" the DNS request. In the first instance (i.e. ignoring the DNS request) this will result in the user's request timing out and the user's browser showing an error message of its own. In the second instance (i.e. alternative IP address being returned to the user's device), this will generally result in the device requesting content from that alternative IP address, which will generally ignore the precise URL and instead return some content other than that desired by the user, such as a page saying that the requested content is blocked.

DNS poisoning is relatively easy to circumvent, however. A user can use a number of approaches to obtain an IP address other than using an ISP's DNS server, including running a DNS server within their home network, using a third-party DNS server (e.g. "Open DNS") or using an alternative "look-up" site and entering a website IP address directly into a browser's address bar, etc.

Looking at this in more detail, there are various ways in which an individual user may arrange for a particular device to avoid using DNS servers (chosen by a parent or other administrator, or by an ISP on their behalf) that implement DNS poisoning-based parental control, and thereby undermine such parental control. Users may, for example, undermine such parental control by:

(1) Specifying a different DNS server;
(2) Using a "hosts" file; or
(3) Typing an IP address in the address bar of a browser, rather than a URL or a canonical name.
(4) Clicking a hyper-link in another website such as a chat forum, an email or other messaging service where the link uses an IP address and not a canonical name In relation to (1), the specified DNS server may be inside or outside the user's local network. It would be possible for a parent or administrator or for an ISP to ensure that all DNS packets destined from the line used by the user's device to any such "other" DNS server outside the local network to be blocked, but such blocking could be circumvented by IP tunneling, for example. Further, such blocking could be circumvented simply by running an "other" DNS server within the user's local network, again successfully circumventing any DNS poisoning.

In relation to (2) and (3), a user could find the mapping from canonical name to IP address via some means other than DNS, such as email contact, chat messages, or bulletin boards, and thus remove their reliance on DNS servers entirely.

It will be noted that for the vast majority of domestic customers, the IP address of the DNS server to use is supplied by their ISP. In this way, only customers who have opted in to content filtering (or not opted out of content filtering, as applicable, depending on what the default situation is) will cause their users' content requests to be subjected to any DNS poisoning or other DNS-based content filtering.

As an alternative to DNS poisoning, it is also known to prevent access to inappropriate content by performing blocking or filtering at the "content request" stage. For this, content requests, which generally contain an indication of an IP address of an applicable content server and the URL of the desired content (as well as an indication of the requester's IP address) can be ignored, blocked or otherwise denied by a filter in dependence on the URL of the desired content or on the IP address of the content server. Both types of filtering have disadvantages, however. For the former (i.e. blocking/ filtering based on URL), content must generally be categorised as appropriate ("good") or inappropriate ("bad") on a URL-by-URL basis, which is often unworkable. The latter (i.e. filtering based on IP address) is less intensive and can be effective, but fails to deal with the fact that one or more content servers at a particular IP address may well host "good" and "bad" content, and that the same IP address may be used for more than one canonical name (as is often the case in respect of Content Delivery Networks (CDNs), for example), so blocking based on IP address may have the unintended consequence of blocking traffic in respect of websites that should not be subject to any such control. It will also be noted that mappings from canonical name to IP address can change.

Blocking based on IP address can be performed by dropping all content to a particular IP address or, in the case of a TCP (Transmission Control Protocol) connection, by dropping just the "SYN" (i.e. synchronisation) packet. Dropping the TCP SYN packet prevents a TCP connection being set up.

Another way of preventing access to certain content involves performing filtering of content being returned to users following successfully-submitted content requests. Typical ways of doing this involve looking for keywords or analysing images or videos. The former (keyword-based analysis) may be relatively simple but can result in many false positives. The latter (image analysis) can be computationally-intensive, leading to increased delays or expense, and can also result in many false positives.

Referring to prior art literature, an article entitled "BT Puts Block on Child Porn Sites" by Martin Bright, published in The Observer newspaper on 6 Jun. 2004 (and available online at http://www.theguardian.com/technololgy/2004/jun/06/childrensservices.childprotection) discusses a system known as "CleanFeed" for blocking images of child pornography. This is further discussed online at http://en.wikipedia.org/wiki/Cleanfeed (content blocking system). With this system, given the illegality of such images in many countries, all customers' lines may be checked. The system uses a two-stage process, based on a confidential blacklist provided by the Internet Watch Foundation (IWF) which contains URLs of pages (i.e. not whole sites) to be blocked (and whose production therefore requires significant human intervention), and a less confidential list of IP addresses of sites potentially containing blocked pages, which is made available to ISPs. The routers of an ISP using the system check traffic destination against the list of IP addresses. If there is no match, the traffic is directed to the content host. If the IP address is on the list, the traffic is routed to proxy servers that check the specific page against the confidential blacklist.

Further discussion of the "Clean Feed" system can be found in an article by Richard Clayton entitled "Failures in a Hybrid Content Blocking System" (Proceedings of the 5th International conference on Privacy Enhancing Technologies, 2005, PET'05, pages 78-92) (available online at http://www.cl.cam.ac.uk/~mcl/cleanfeed.pdf).

Referring to prior patent documents, United States application US2012/084423 discloses a method and system for domain based dynamic traffic steering. A domain name is compared to a blacklist and/or whitelist of domain names and if it is on either, the corresponding IP blacklist or whitelist is updated with the IP address for the domain.

United States application US2011/0078309 describes a data processing apparatus comprising a traffic monitor which can create and manage lists of IP addresses to track, which IP addresses were triggered by DNS look-ups for domain names. As a result, it is claimed that actions can be taken for domains or portions of domains instead of taking action only based on IP addresses, so that not all traffic from the corresponding IP address is affected or acted upon in the same way as with a typical firewall that acts based upon IP addresses alone. It is noted that multiple names may resolve to the same IP address, and that a host in a "bad" domain could map to an otherwise normally "good" IP address.

U.S. Pat. No. 7,792,994 relates to correlating network DNS data to filter content. A DNS request made by an internal host in a network to obtain an IP address and the corresponding response from a DNS server are intercepted and cached. By caching the DNS request and the corresponding response, the IP address the host thinks is associated with the domain name, URI, or other identifier for which the corresponding IP address was requested from the DNS server is known. When the host subsequently uses the IP address to open a TCP (or TCP/IP) connection, the IP address is mapped to the corresponding domain name in the cache and it is determined whether the domain name is in a block list.

U.S. Pat. No. 7,849,502 relates to apparatus for monitoring network traffic, in particular for preventing spyware and other threats from harming computer networks.

International application WO2012/162099 relates to use of DNS communications to filter domain names. A domain name is extracted from a received DNS request. The received DNS request is blocked in response to determining based on a policy that access to the domain name of the DNS request is not permitted. In some cases, such a DNS request is responded to with a spoofed DNS response.

United States application US2007/0204040 relates to techniques for filtering domain names through the DNS. It uses a domain name processing application that generates a filtering domain name based on a filter service to a domain name. A DNS resolver sends the filtering domain name to a filter service through the DNS. The filter service determines if the filtering domain name is approved and returns a DNS record indicating whether the domain name is approved. The DNS resolver receives the DNS record from the filter service and sends a response to the user.

SUMMARY OF THE INVENTION

According to a first aspect of the present invention, there is provided a method of processing digital content service requests from one or more user devices, each service request relating to digital content provided by a content provider and comprising at least one server location request and at least one subsequent content request associated therewith, the at least one server location request comprising an indication of a network name associated with a content provider from which digital content is desired by a user of a user device, and the at least one content request comprising:

an indication of a digital content item desired by a user of a user device; and     a content server routing identifier indicating the network location of a content server deemed to be capable of serving content requests for digital content provided by the content provider with which the network name indicated in the associated server location request is associated;

the method comprising:

receiving a server location request from a user device in respect of a content item desired by a user of the user device;

determining whether to serve or deny the server location request in dependence on whether the network name indicated by the server location request is designated as being of a first or a second type, and provided that the indicated network name is not designated as being of the second type, serving the server location request by providing as a response to the server location request an indication of a content server routing identifier indicating the network location of a content server deemed to be capable of serving a content request in respect of the content item desired by the user;

subsequently receiving a content request in respect of the desired content item;

determining whether the content server routing identifier of the content request is designated as being of a first or a second type;

allowing the content request if the content server routing identifier is not designated as being of the second type;

allowing the content request if the content server routing identifier is designated as being of the second type if it has been determined in response to an associated server location request that the content provider with which the network name indicated in the associated server location request is designated as being of the first type;

and otherwise denying the content request.

The network names or the indications thereof may be canonical names of websites, or website names. In relation to the designation of network names as being of a first or a second type, it will be appreciated that content provided by content providers via a particular website may be deemed appropriate by one entity and inappropriate by another entity. From the point of view of a particular entity (such as an ISP, for example), a website may be deemed either appropriate (and therefore be designated by that ISP as being of a first type) or inappropriate (and therefore be designated by that ISP as being of a second type). Other meanings may be associated with the first and second types, however, such as "suitable for children" and "unsuitable for children", "acceptable" and "unacceptable", etc. Irrespective of the semantics involved, a particular entity (such as an ISP, for example) may designate network names as being of a first or a second type simply to allow a simple decision to be made as to whether DNS requests in respect thereof should be served or denied.

In a corresponding manner, content servers (which may be those of a Content Delivery Network (CDN), those of a content provider itself, or other types of content server) may be deemed "good" or "bad", "trustworthy" or "untrustworthy", or otherwise. Irrespective of the semantics involved, a particular entity (such as an ISP, for example) may designate the content server routing identifiers associated therewith (which may be IP addresses) as being of a first or a second type simply to allow a simple decision to be made as to whether content requests directed thereto should generally be allowed or denied.

A digital content item may be a web-page or a portion thereof, or one or more pages from or digital content items referred to on a website, for example.

According to preferred embodiments, the at least one content request may comprise a user device routing identifier indicating the network location of the user device. This may be the IP address of the user device or of a home gateway device such as a home hub, for example, or may be some other identifier, allowing a response to the content request to be returned to the appropriate device.

In such embodiments, the step of allowing the content request if the content server routing identifier is designated as being of the second type may comprise allowing the content request if the user device routing identifier indicates that it has been determined in response to a server location request from a device having the same or a corresponding user device routing identifier that the content provider with which the network name indicated in the associated server location request is designated as being of the first type.

According to preferred embodiments, the method may comprise storing one or more entries indicative of one or more content server routing identifiers in respect of which one or more content requests should be allowed. In this way, the stored entries may serve as an "exception list" indicative of content servers to which content requests should be allowed at least temporarily because they host at least some content items that have been deemed "acceptable" or "appropriate" (as well as some that have been deemed "unacceptable" or "inappropriate"), for example, and to which a content request (that has been made in respect of "acceptable" or "appropriate" content) should therefore be allowed.

In such embodiments, each entry may further be indicative of one or more user device routing identifiers in respect of which one or more content requests for a digital content item from a content server having a content server routing identifier indicated by the entry should be allowed. Such entries may allow content requests to be allowed only if they have been submitted by or in respect of the same user device that previously submitted a DSN request in respect of a website deemed to be appropriate, the content from which is available from the content server in question.

In such embodiments, the method may further comprise updating the one or more stored entries after a period of time whereby to remove indications of the one or more content server routing identifiers in respect of which content requests should be allowed. This may involve (or be equivalent to) keeping such entries on an "exception list" for a period of time, then deleting them or otherwise treating them as being "timed-out". The period of time in question may be predetermined, and may correspond to approximately a few round-trip times (e.g. two, three, four, etc.), a round-trip time being the approximate time usually taken to server a DNS request and/or a content request, for example. Preferably the period of time may be of the order of one to two round-trip times. Alternatively, exception list entries may be removed in response to a determination that they have been "used" once, in response to another type of determination that content requests should not generally be allowed any longer, or otherwise. In another alternative, exception list entries need not "time out" at all.

According to preferred embodiments, the method may be performed by one or more processing devices in respect of digital content service requests from one or more user devices located in a user network, the one or more processing devices being located in an external network, the one or more user devices in the user network being in communication with the external network via a gateway device.

The steps of "receiving a server location request" and "determining whether to serve or deny the server location request" are preferably performed by a location request server such as a "DNS server", which may be operated by or on behalf of an ISP.

The steps of "receiving a content request", "determining whether the content server routing identifier of the content request is designated as being of a first or a second type" and of "allowing" or "denying" the content request are preferably performed by one or more content request filtering routers, which may be suitably enabled routers, and which may be operated by or on behalf of an ISP.

The action of "denying" a server location request may comprise one or more of (i) not responding; (ii) responding with an indication of a content server routing identifier indicating the network location of a content server other than that deemed to be capable of serving a content request in respect of the content item desired by the user; (iii) responding with a message. Other options are possible, however.

The action of "allowing" a content request may comprise forwarding the content request to a content server deemed to be capable of serving content requests for the desired content, and/or allowing the desired content item to be forwarded to the user device (e.g. having received and possibly inspected the content in question from the content server).

The action of "denying" a content request may comprise one or more of (i) not forwarding the content request to a content server deemed to be capable of serving content requests for the desired content; (ii) forwarding the content request to a content server other than that deemed to be capable of serving a content request in respect of the desired content item; (iii) responding with a message; (iv) preventing the desired content item from being forwarded to the user device. Other options are possible, however.

According to a second aspect of the present invention, there is provided apparatus for processing digital content service requests from one or more user devices, each service request relating to digital content provided by a content provider and comprising at least one server location request and at least one subsequent content request associated therewith, the at least one server location request comprising an indication of a network name associated with a content provider from which digital content is desired by a user of a user device, and the at least one content request comprising:
    an indication of a digital content item desired by a user of a user device; and
    a content server routing identifier indicating the network location of a content server deemed to be capable of serving content requests for digital content provided by the content provider with which the network name indicated in the associated server location request is associated;
the apparatus comprising:
a server location request processor operable to receive a server location request from a user device in respect of a content item desired by a user of the user device, and to determine whether to serve or deny the server location request in dependence on whether the network name indicated by the server location request is designated as being of a first or a second type, and provided that the indicated network name is not designated as being of the second type, serving the server location request by providing as a response to the server location request an indication of a content server routing identifier indicating the network location of a content server deemed to be capable of serving a content request in respect of the content item desired by the user; and
a content request processor operable to:
receive a content request in respect of the desired content item;
determine whether the content server routing identifier of the content request is designated as being of a first or a second type;
allow the content request if the content server routing identifier is not designated as being of the second type; and
allow the content request if the content server routing identifier is designated as being of the second type if it has been determined in response to an associated server location request that the content provider with which the network name indicated in the associated server location request is designated as being of the first type;
and operable to deny the content request otherwise.

The various options and preferred embodiments referred to above in relation to the first aspect are also applicable in relation to the second aspect.

Preferred embodiments may be thought of as making use of a combination of the techniques referred to as "DNS poisoning" and "content request filtering" in a way that uses DNS poisoning to deny DNS requests made in respect of websites that appear on a "website blacklist" and uses content request filtering to block content requests (e.g. those made using IP addresses obtained by circumventing DNS poisoning) to content servers at IP addresses that appear on an "IP address blacklist". Such a combination alone is generally able to prevent easy circumvention of DNS poisoning as described above, but is likely also to prevent access to "appropriate" content that is available from a content server at an IP address that is also known to provide "inappropriate" content. Preferred embodiments may avoid the unwanted prevention of access to such "appropriate" content by maintaining an "exception list" to the "IP address blacklist". This "exception list" may be updated based on (recent) DNS requests to reflect that a particular user is actually attempting to access "appropriate" content (i.e. content from a particular non-blacklisted website), and results in a subsequent content request for that content being allowed even if the IP address of the applicable content server has been blacklisted.

BRIEF DESCRIPTION OF THE DRAWINGS

A preferred embodiment of the present invention will now be described with reference to the appended drawings, in which.

DESCRIPTION OF PREFERRED EMBODIMENTS OF THE INVENTION

With reference to the accompanying figures, a method and apparatus for performing content control according to a preferred embodiment will be described.

In the following description, the term "administrator" will generally be used in relation to the person or people responsible for control of the controlled network in question. As indicated earlier, the network to be controlled may be a network such as a home network, a school network, a corporate network, a network of an Internet cafe, or another network where the administrator may wish to be able to exercise some level of control over the content that individual "users" may access using networked computing devices such as those referred to earlier. The network may be a wired network, a wireless network, or a combination of the two. It may be a local network within one or more buildings or other premises, a VPN serving devices in one or more geographical areas, or any of a variety of other such networks. The "administrator" may be a parent or other such customer of an ISP (e.g. in the context of a home network), but it will be apparent that the role of "administrator" will be performed by different types of people in relation to different scenarios.

The terms "user" and "users" will generally be used in relation to a person or people using networked computing devices in the network under the control of the administrator. The administrator may also be a user, of course, and may also be the "customer" of the ISP in respect of the network in question.

Figure 1:
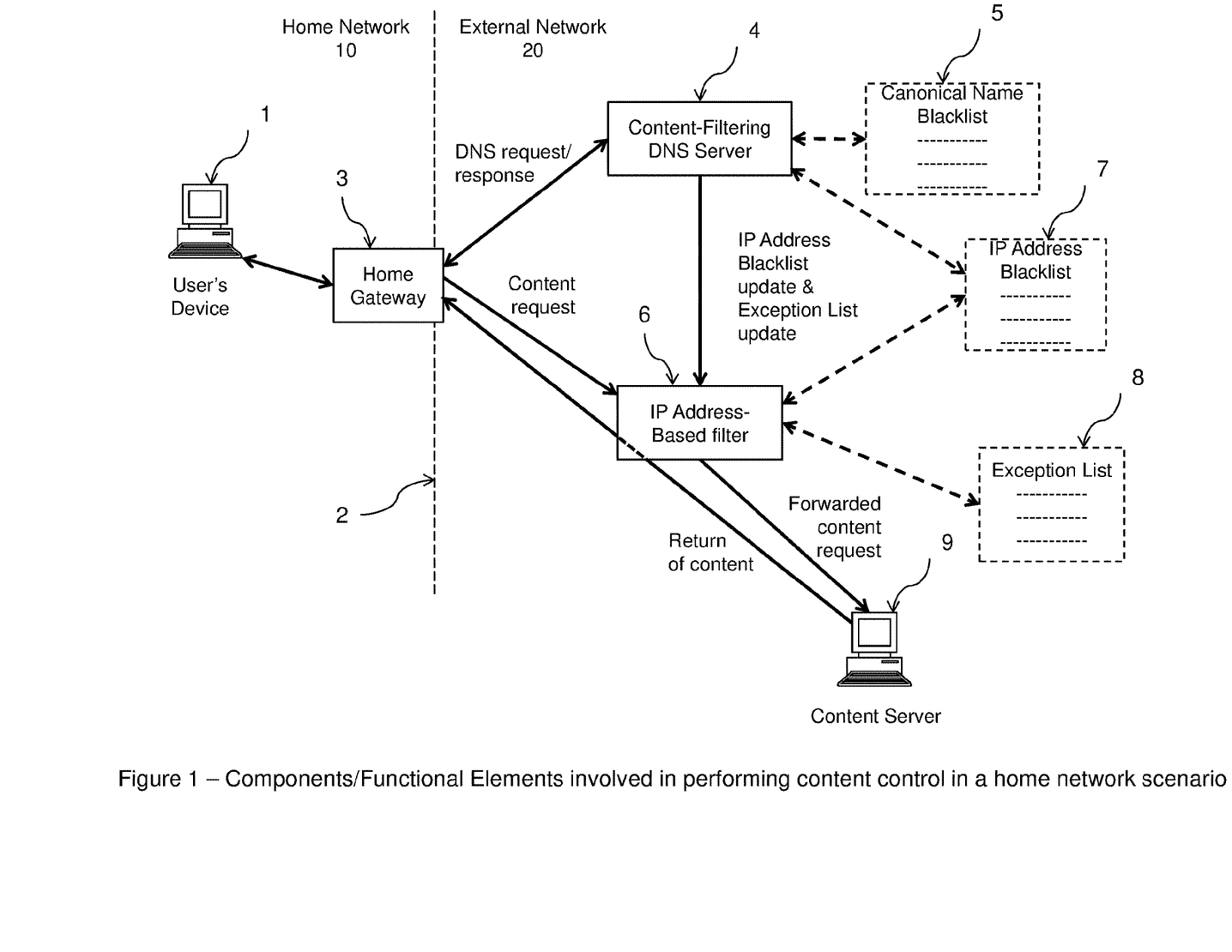
FIG. 1 shows the principal components and functional elements involved in performing content control according to a preferred embodiment.

FIG. 1 shows the principal components and functional elements involved in performing content control according to a preferred embodiment in a context where the network to be controlled is a home network 10. One user device 1 is shown, although it will be understood that there may be several. A notional boundary (indicated by dotted line 2), which may be defined by a "home gateway" device 3 (such as a "Home Hub") exists between the home network 10 and the external network 20.

We consider a situation where a user using a networked computing device (or "user device") 1 in the home network 10 wishes to download content from a server in the external network 20 to the user device 1 via the Internet. The content may be available for downloading from a number of different content servers 9 (of which one is shown), each of which is contactable by user devices provided they have the IP address of the applicable content server 9, but unless the user device 1 in question has previously obtained the IP address in question (e.g. from a DNS server, in the course of making an earlier request in respect of the same content, or from an alternative information source such as an alternative "look-up" site, for example), the user device 1 will generally need to instigate a "name look-up" procedure by sending a DNS request to a DNS server.

If the administrator (or other such customer) has opted in for content control (or not opted out, if content control is the default mode), then the device 1 will generally have been given the address of a content-filtering DNS server 4 by the home gateway 3. This will generally operate under the control of or on behalf of the administrator's (or customer's) ISP in relation to how it responds to DNS requests from user devices 1 in the home network 10. Also, it will be arranged (again, generally by the ISP in question) that content requests destined for content servers 9 from user devices 1 in the home network 10 are routed via an IP address-based filter 6, the functionality of which will be explained later.

As will be explained in more detail later, in the present embodiment, the content-filtering DNS server 4 maintains or is otherwise provided with a blacklist 5 of websites (i.e. canonical names) that are known or have been found to include or be associated with inappropriate content. The DNS server 4 periodically goes through its blacklist 5 of website names and produces a blacklist 7 of IP addresses, the entries thereon being IP addresses of servers from which content from the websites on the "canonical name blacklist" 5 can be requested and obtained. This "IP address blacklist" 7 is made available to the IP address-based filter 6, which may store the IP address blacklist 7 (locally or otherwise) as well as or instead of it being stored at or by the content-filtering DNS server 4, or may consult the list subsequently or when necessary.

If a user device 1 sends a DNS request to a content-filtering DNS server 4 in respect of a website that appears on the "canonical name blacklist" 5 (e.g. www.badcontent-.com) this will be detected by the content-filtering DNS server 4 which will "deny" the DNS request. As discussed earlier, the DNS server 4 can do this by ignoring the DNS request completely, returning an error/warning message, returning the IP address of a server that will respond to a content request in respect of content from the website in question by sending an error/warning message, or in some other way that does not involve the user's device receiving the IP address of a server that will respond to a content request in respect of the content from the blacklisted website with content from that website. The "name look-up" procedure will therefore not have put the user device 1 into a position in which it is able to request content from the blacklisted website.

If a user tries to avoid using the content-filtering DNS server 4 (by using a circumvention technique such as those outlined earlier, for example (e.g. obtaining the IP address of the desired content server from a DNS server run within their home network or from a third-party DNS server, or using an alternative "look-up" site and entering the IP address directly into their browser's address bar, etc.), then the user device 1 will try to connect to the content server 9 by sending (if using TCP) a SYN packet destined for a server having the IP address that has been obtained. When this packet is received at the IP address-based filter 6, this will look up the IP address in IP address blacklist 7. If the IP address is on that list, it may drop the SYN packet, or otherwise prevent the user device from sending its content request to the content server 9. An alternative to simply dropping the SYN packet is that every packet destined for a blacklisted IP address is dropped.

As explained earlier, blocking content requests based on the IP address of the server to which they are directed can cause a problem where blocked websites are served from the same IP address as non-blocked sites (e.g. if the canonical name www.badcontent.com resolves to the same IP address as www.goodcontent.com). This can happen because what is undesirable according to some people, some organisations or in some jurisdictions may be acceptable, legitimate and/or legal content according to others. Also, as explained earlier, one or more content servers at a particular IP address may well host "good" and "bad" content, and the same IP address may be used for more than one canonical name.

For reasons such as the above, with the present embodiment, at least one additional step is performed prior to any content being provided to the user in response to a content request. This step involves checking whether or not a DNS look-up request has just been made in respect of the canonical name of any content request that is being made. According to the present embodiment, a content request for content from a website whose canonical name is not on the canonical name blacklist 5 will only be denied at the "content request" stage (e.g. by dropping the "SYN" packet, by dropping all associated packets, by blocking the returned content, or otherwise) if there has not (recently) been an associated DNS look-up request to the content-filtering DNS server concerned. If there has (recently) been an associated DNS look-up request, and it has been found that the canonical name in question is not on the canonical name blacklist 5, there will be an entry on an exception list 8 in respect of the user or user device 1 in question and in respect of the IP address of the content server 9 in question, indicating that a content request from the user or user device 1 in question for content from a content server at the IP address in question should not be denied even if the content server 9 happens to be an IP address on the IP address blacklist 7 (possibly due to the content server 9 hosting some "inappropriate" content as well as the "appropriate" content that the user actually wants to obtain).

A process for performing such a procedure can be implemented in the following manner:

Say a user is attempting to obtain content having a particular URL from website www.badcontent.com. The user device makes a DNS request in respect of the canonical name www.badcontent.com, content from which has been deemed "inappropriate". The content-filtering DNS server 4 looks this up on the canonical name blacklist 5 and finds it there. It therefore "denies" the DNS request (by not responding to it or otherwise). The user device may try again (and typically will do so about 4 or 5 times) before timing out.

In this case, the user (or user device) may then discover the (or an) IP address for www.badcontent.com and may therefore write the details into the device's "hosts" file. Now, when the user attempts to obtain content from www.badcontent.com, the device will look in its "hosts" file and be able to obtain the necessary IP address for making the content request, rather than having to perform a DNS look-up with the ISP's content-filtering DNS server. The user device can therefore make a request for the desired (but inappropriate) content using that IP address. However, provided the home network is set up appropriately such that content requests from user devices are sent via home gateway 3, or that the content request is not routed in such a way as to avoid the routers and lines under the control of the ISP and/or network provider chosen by the customer or local administrator entirely, the request will be passed to the IP address-based filter 6, which has stored therein (or can access) the IP address blacklist 7. As the content request is directed to an IP address on the IP address blacklist 7, the content request is denied (in one of the ways described earlier, or otherwise). Now, say a user wishes to obtain content from website www.goodcontent.com. The user device makes a DNS request in respect of the canonical name www.goodcontent.com. The content-filtering DNS server 4 looks this up on the canonical name blacklist 5 and finds that it is not there, so the IP address for this canonical name is returned to the user device, which can therefore send a content request to a server having that IP address. There is an additional step of looking up the IP address to which the content request is being made (i.e. that of the content server 9 in question) on the IP address blacklist 7. This step, which is generally performed by the content-filtering DNS server 4, but may in certain cases be performed by the IP address-based filter 6, is done for all lines/customers where filtering is to be applied. If www.goodcontent.com is hosted by a server at an IP address present on the IP address blacklist, then the fact that the user device in question has previously submitted a DNS look-up request for a non-blocked canonical name at this time will have been recorded, and reflected by an associated entry which is made in an "exception list" 8 which is passed by the content-filtering DNS server 4 to the IP address-based filter 6, or maintained by the IP address-based filter 6 in dependence on information passed to it by the content-filtering DNS server 4. Where an entry has been put on the exception list then the DNS response to the user device will generally have a Time To Live (TTL) value set to zero so that the user device does not cache the DNS response. All subsequent requests for content will generally also require a DNS lookup. When the user device 1 subsequently sends packets (i.e. a content request) to a content server 9 at the IP address in question, the IP address-based filter 6 looks up the address on the IP address blacklist 7, and also looks it up on the exception list 8. The presence of the IP address on the exception list 8 for the user's network or device means that the request is allowed through. The entries on the exception list 8 will time-out after a period of time, which may be of the order of a few (e.g. two, three, four, etc.) round-trip times (RTTs), or of the order of one to two RTTs, depending on the precise implementation being used. For example, in the case of embodiments in which content requests are denied by the dropping of the SYN packet, a time period of between one to two RTTs would generally be suitable, because with nearly all content requests, the SYN packet should be seen by the IP address-based filter 6 between one and two RTTs after the content-filtering DNS server 4 has received the associated DNS request. With other embodiments, it may be appropriate to use a longer time-period before removing entries from the exception list (say, a time period of up to ten RTTs, or a time period of up to a few seconds, minutes or hours), or whatever is deemed appropriate to ensure that all (or the majority of) content requests that should be allowed are allowed, while preventing entries from remaining on the exception list for long enough that later content requests for other (e.g. inappropriate) content are also allowed. Also the DNS response does not have to have set a minimum TTL.

Figure 2:
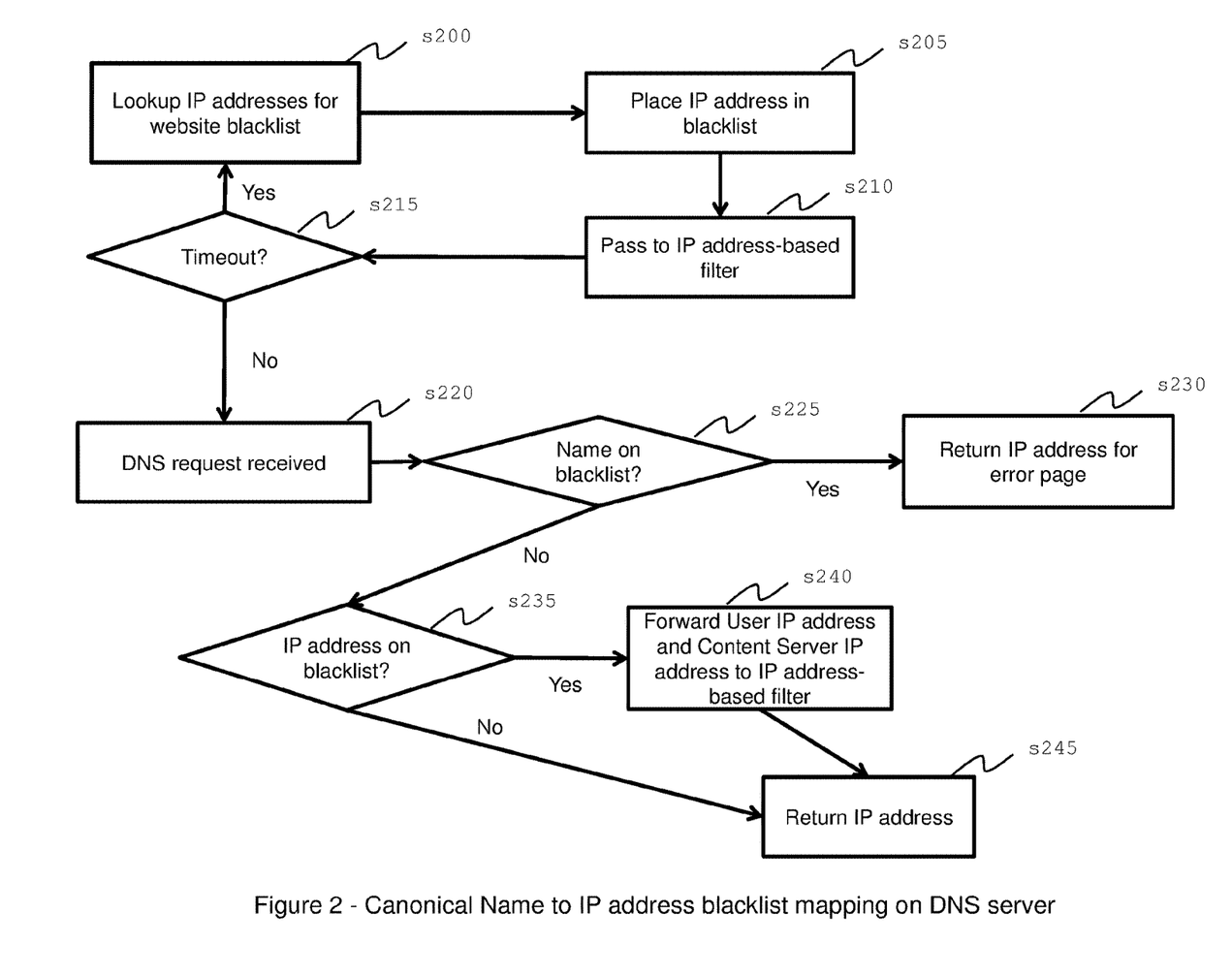
FIG. 2 illustrates steps that may be performed by a content-filtering DNS server involved in performing content control according to a preferred embodiment.

FIG. 2 shows how the content-filtering DNS server 4 operates in a preferred embodiment. Periodically the DNS server 4 will look up the IP addresses for all the canonical names on its canonical name blacklist 5 (s200) to create or update the IP address blacklist 7 (s205). It will be noted that this does not have to be done for every name on the canonical name blacklist. It may be done in proportion to the relative volume of traffic to the blacklisted websites. Information on use can come from publicly-available statistics for website use or from an ISP's own non-content-filtering DNS servers, for example. The IP address blacklist is forwarded to the IP address-based filter (s210). The "blacklisted website names" to "blacklisted IP addresses" conversion will happen again after a set timeout period (s215).

When a user device 1 needs a canonical name to be translated into a routable IP address, the content-filtering DNS server 4 receives a DNS request (s220). It checks whether the name is on the canonical name blacklist (s225). If so, the DNS server 4 denies the DNS request (ignoring the request, returning an IP address for an error page, returning a DNS error message, or otherwise, as explained earlier) (s230). In preferred embodiments, receipt and processing of a DNS request that is found to be in respect of a blacklisted canonical name may trigger the IP address blacklist to be updated.

If the name is not on the canonical name blacklist 5 then the IP address blacklist 7 is also checked (s235) by the DNS server 4. This essentially establishes whether the IP address is used for both blacklisted and non-blacklisted content. If the IP address is on the IP address blacklist 7 (despite the earlier finding that the website name is not on the canonical name blacklist 5), the user device's IP address (or other identifier) is sent to the IP address-based filter 6 to add to its exception list 8 (s240). The exception list 8 contains a series of tuples where each tuple contains or reflects the IP address (or other identifier) of the user device, the (or an) IP address for the website in question, and the time the associated DNS look-up operation was performed. The exception list 8 is compiled essentially in order to ensure that a user will not be prevented from requesting and obtaining content from a website the content from which is deemed to be "appropriate" (e.g. www.goodcontent.com) simply because it happens to be hosted by a server at the same IP address as a website the content from which is deemed to be "inappropriate" (e.g. www.badcontent.com). In either case (i.e. if the website name is not on the canonical name blacklist 5, but irrespective of whether the IP address is on the IP address blacklist 7), the IP address of a server able to provide the required content is returned to the user's device as per normal DNS server operations (s245), which may then use it to submit a content request.

It should be noted that the "content-filtering" DNS server 4 does not (generally) filter content itself, this (generally) being the function of the module referred to as the IP address-based filter 6. The term "DNS-request-filtering DNS server 4 may be thought to be more descriptive, as the specific function performed by the module 4 in the present embodiment generally involves serving or denying DNS requests rather than content requests, but as the function of the module 4 is part of an overall process—in this embodiment involving cooperation with a separate IP address-based filter 6—of processing content requests (for "parental control" or other reasons), it seems appropriate to refer to the module 4 as a "content-filtering DNS server 4", in order to distinguish it from prior DNS servers that merely perform "DNS poisoning" or similar.

In relation to the above, it should also be noted that the content-filtering DNS server 4 and the IP address-based filter 6, which in the present embodiment are described as being separate modules, need not be remote geographically or in terms of network topology. Their functionality may in fact be performed within the same piece of processing hardware.

Figure 3:
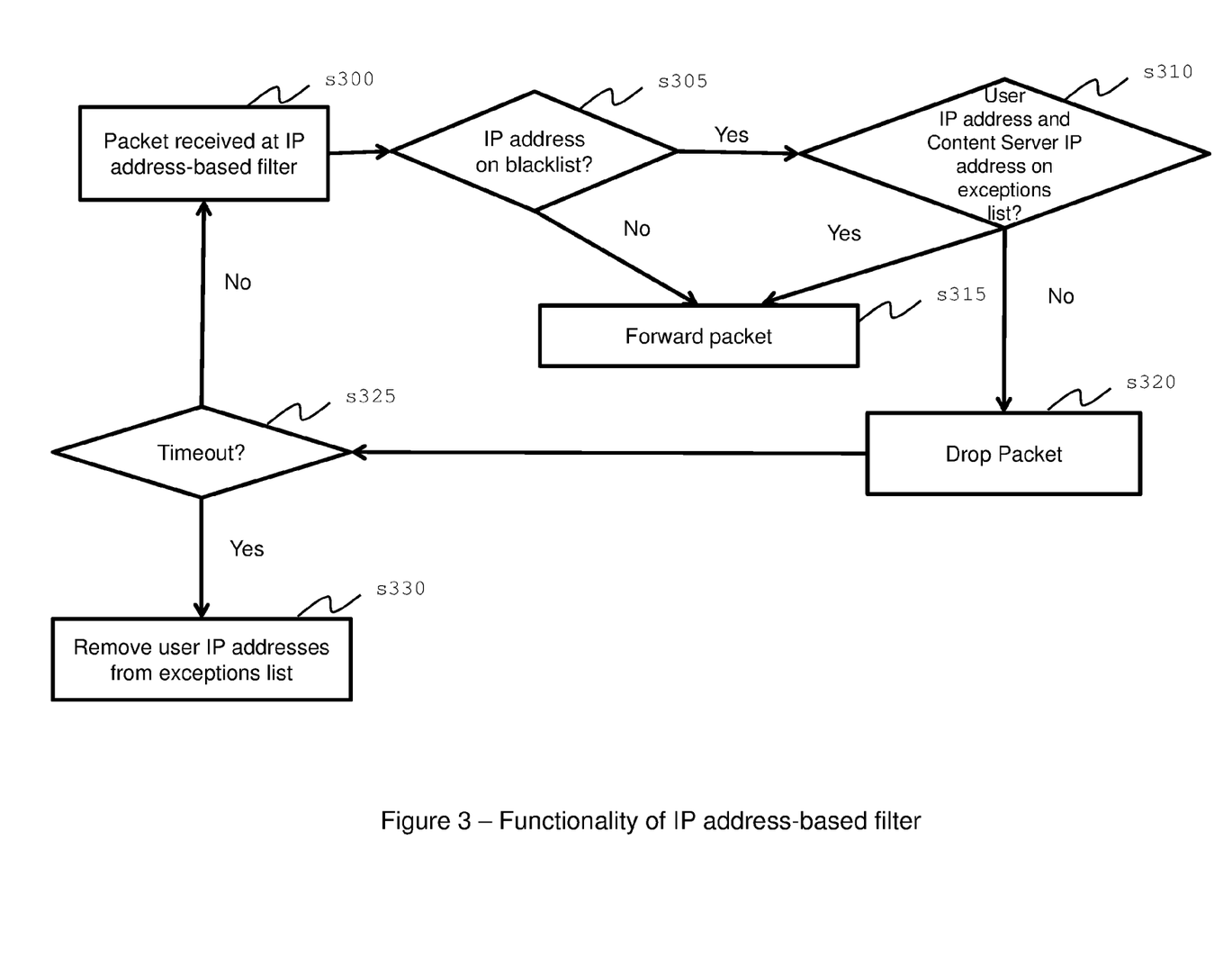
FIG. 3 illustrates steps that may be performed by an IP address-based filter involved in performing content control according to a preferred embodiment.

FIG. 3 shows the corresponding actions of the IP address-based filter 6. It will be understood that this may be at the same location in the network as the content-filtering DNS server 4, and may reside on the same machine, but may also be at a different location in the network. Preferably it will be operated under the control of or on behalf of the same entity (e.g. the applicable ISP).

A content request (which may be a single packet, multiple packets, or otherwise), which in general contains information indicative of the IP address of the user device as well as that of the chosen content server 9, and also contains the URL of the requested content, is received at the IP address-based filter 6 (s300). The IP address of the chosen content server 9 is compared to those on the IP address blacklist 7 (s305). If the IP address of the content server 9 is not on the blacklist 7, the request can be forwarded (s315), and no further "checking" or "denying" action is needed. If the IP address of the content server 9 is on the blacklist 7, then the IP address (or other identification data) of the user device 1 is checked against the exception list 8 (s310). An entry on the exception list 8 for the tuple <user IP address, good content IP address, time> means that the user device has recently looked up the IP address of the content server 9 from the DNS server 4 for a website that should not be subject to filtering, so the content request can be forwarded to the content server 9 (s315). If there is no entry in the exception list 8 then the request is denied (e.g. by dropping one or more packets, or otherwise, as applicable) (s320). According to the present embodiment, this may simply involve dropping the TCP SYN packet of the content request, thereby preventing a TCP connection from being established.

It will be appreciated that with embodiments such as those in which content requests are denied by dropping or otherwise not forwarding content requests to content servers, it may not be necessary to inspect content being returned from content servers, so the returned content need not pass via the IP address-based filter 6. In some embodiments, however, content being returned from content servers may be inspected by IP address-based filter 6 and/or by another filtering module (not shown). The "return of content" arrow in FIG. 3 is therefore shown having a dotted section where it passes through the IP address-based filter 6, but this should not be taken to imply that content must always pass through the IP address-based filter 6 on its way to a user device.

The exception list 8 should generally be refreshed frequently. After a certain period of time has passed (s325), entries in the exception list should generally be removed (s330).

There are various alternatives to having a "time-out" period after which entries are removed from the exception list, which may be used in addition or instead. When not relying on time an exception list will generally contain only the IP addresses that are on the IP address blacklist 7 but a canonical name that is not on the canonical name blacklist 5. The exception list may be built up in the same way as described previously. Each time a DNS request is made in respect of content from a website or content provider whose canonical name is not on the canonical name blacklist 5 but the applicable content server for which is on the IP address blacklist 7, a new entry is made on the exception list 8 (in s240 of FIG. 2, for example). In s310, any IP destination on the exception list may be subjected to further checking before the content request in question is either allowed or denied. Filtering can make use of the fact that only a limited set of IP addresses will generally be on an exception list. Instead of applying techniques to deny access to filtered content to every piece of content, they may only be applied where IP addresses are shared between good content and bad content.

Content can be filtered based on textual analysis thereof (or of the requested URL itself) e.g. by keyword analysis.

Content can be filtered when it is received at the IP address-based filter 6 based on an analysis of that content. For example, content containing certain keywords or URLs starting with a canonical name that is on the DNS blacklist may be filtered.

The requested URL may be on a "Good URL" list. Good URLs can be discovered by web-crawling. This may involve the exception list tuple being extended to include the canonical name of the website looked up at the DNS server 4 in step s240 of FIG. 2. When the IP address-based filter 6 first receives a request for content from a content server at an IP address on the exception list, it can make its own content request for the home web-page at the canonical name in question (i.e. with no URL extension), follow the URLs supplied in the home-page, then follow the URLs returned in those where they relate to pages on the original web-site. The IP address-based filter then only allows access to those URLs in its stored list. The same list can be used for other users when they try to access content from a server at the same IP address.

The invention claimed is:

1. A method of processing digital content service requests from one or more user devices, each digital content service request relating to digital content provided by a content provider and comprising at least one server location request and, subsequently, at least one content request associated therewith, the method comprising:
receiving the at least one server location request from a particular user device with respect to a digital content item desired by a user of the particular user device, wherein the received at least one server location request comprises an indication of a network name associated with a particular content provider providing the digital content item desired by the user;
determining whether to serve or deny the received at least one server location request based on whether the network name indicated by the received at least one server location request is on a stored blacklist of network names designated to be denied;
determining that the network name is not on the stored blacklist of network names and providing a response to the received at least one server location request, the response comprising an indication of a content server routing identifier indicating a network location of a content server deemed to be capable of serving a content request for the digital content item desired by the user;
subsequently receiving, from the particular user device, the at least one content request associated with the received at least one server location request, the at least one content request comprising:
an indication of the digital content item desired by the user; and
the content server routing identifier provided in the response to the received at least one server location request;
determining whether the content server routing identifier of the at least one content request is on a stored blacklist of routing identifiers designated to be denied;
allowing the at least one content request when the content server routing identifier is determined not to be on the stored blacklist of routing identifiers;
when it is determined that the content server routing identifier is on the stored blacklist of routing identifiers, determining whether the content server routing identifier is on a stored exception list of content server routing identifiers indicating that the network name Indicated in the received at least one server location request was previously determined not to be on the stored blacklist of network names;
allowing the at least one content request when the content server routing identifier is on the stored exception list;
and otherwise denying the at least one content request.

2. The method according to claim 1 wherein the at least one content request comprises a user device routing identifier indicating a network location of the particular user device.

3. The method according to claim 2 wherein the step of allowing the at least one content request when the content server routing identifier is on the stored exception list comprises allowing the at least one content request when the user device routing identifier indicates that a determination has been made in response to a server location request from a device having the same or a corresponding user device routing identifier that the network name indicated in the received at least one server location request is not on the stored blacklist of network names.

4. The method according to claim 1 wherein the method comprises storing one or more entries indicative of one or more content server routing identifiers to which one or more content requests should be allowed.

5. The method according to claim 4 wherein each of the one or more stored entries is further indicative of one or more user device routing identifiers from which one or more content requests for a digital content item from a content server having a content server routing identifier indicated by the entry should be allowed.

6. The method according to claim 4 wherein the method further comprises updating the one or more stored entries after a period of time whereby to remove indications of the one or more content server routing identifiers to which one or more content requests should be allowed.

7. The method according to claim 1, the method being performed by one or more processing devices processing digital content service requests from one or more user devices located in a user network, the one or more processing devices being located in an external network, and the one or more user devices in the user network being in communication with the external network via a gateway device.

8. The method according to claim 1 wherein the steps of receiving the at least one server location request and determining whether to serve or deny the received at least one server location request are performed by a location request server.

9. The method according to claim 1 wherein the steps of receiving the at least one content request, determining whether the content server routing identifier of the at least one content request is on the stored blacklist of routing identifiers and allowing or denying the at least one content request are performed by one or more content request filtering routers.

10. The method according to claim 1 wherein denying the received at least one server location request comprises one or more of (i) not responding; (ii) responding with an indication of a content server routing identifier indicating a network location of a content server other than that the content server deemed to be capable of serving a content request for the digital content item desired by the user; (iii) responding with a message.

11. The method according to claim 1 wherein allowing the at least one content request comprises forwarding the at least one content request to the content server deemed to be capable of serving a content request for the digital content item desired by the user.

12. The method according to claim 1 wherein allowing the at least one content request comprises allowing the digital content item desired by the user to be forwarded to the particular user device.

13. The method according to claim 1 wherein denying the at least one content request comprises one or more of (i) not forwarding the at least one content request to the content server deemed to be capable of serving a content requests for the digital content item desired by the user; (ii) forwarding the at least one content request to a content server other than the content server deemed to be capable of serving a content request for the digital content item desired by the user; (iii) responding with a message; (iv) preventing the digital content item desired by the user from being forwarded to the particular user device.

14. An apparatus for processing digital content service requests from one or more user devices, each digital content service request relating to digital content provided by a content provider and comprising at least one server location request and, subsequently, at least one content request associated therewith, the apparatus comprising:
   a server location request hardware processor configured to receive the at least one server location request from a particular user device with respect to a digital content item desired by a user of the particular user device, wherein the received at least one server location request comprises an indication of a network name associated with a particular content provider providing the digital content item desired by the user, and to determine whether to serve or deny the received at least one server location request based on whether the network name indicated by the received at least one server location request is on a stored blacklist of network names designated to be denied, determining that the network name is not the stored blacklist of network names and provide a response to the received at least one server location request, the response comprising an indication of a content server routing identifier indicating a network location of a content server deemed to be capable of serving a content request for the digital content item desired by the user; and
   a content request hardware processor configured to:
      subsequently receive, from the particular user device, the at least one content request associated with the received at least one server location request, the at least one content request comprising:
         an indication of the digital content item desired by the user; and
         the content server routing identifier provided in the response to the received at least one server location request;
      determine whether the content server routing identifier of the at least one content request is on a stored blacklist of routing identifiers designated to be denied;
      allow the at least one content request when the content server routing identifier is determined not to be on the stored blacklist of routing identifiers; and
      when it is determined that the content server routing identifier is on the stored blacklist of routing identifiers, determine whether the content server routing identifier is on a stored exception list of content server routing identifiers indicating that the network name indicated in the received at least one server location request was previously determined not to be on the stored blacklist of network names;
      allow the at least one content request when the content server routing identifier is on the stored exception list;
      and deny the at least one content request otherwise.

15. The apparatus according to claim 14 wherein the at least one content request comprises a user device routing identifier indicating a network location of the particular user device.

16. The apparatus according to claim 15 wherein the content request hardware processor is further configured to: allow the at least one content request if the user device routing identifier indicates that it has been determined In response to a server location request from a device having the same or a corresponding user device routing identifier that the network name indicated in the received at least one server location request is not on the stored blacklist of network names.

17. The apparatus according to claim 14 wherein the apparatus is configured to store one or more entries indicative of one or more content server routing identifiers to which one or more content requests should be allowed.

18. The apparatus according to claim 17 wherein each of the one or more entries is further indicative of one or more user device routing identifiers from which one or more content requests for a digital content item from a content server having a content server routing identifier indicated by the entry should be allowed.

19. The apparatus according to claim 14 wherein the server location request hardware processor and the content request hardware processor are at different geographic locations.

20. The apparatus according to claim 14 wherein the server location request hardware processor and the content request hardware processor reside in a same machine.

* * * * *